(12) United States Patent
Williamson

(10) Patent No.: US 9,625,666 B2
(45) Date of Patent: Apr. 18, 2017

(54) LOOSE-TUBE FIBER OPTIC CABLES HAVING BUFFER TUBES WITH BETA PHASE CRYSTALLIZATION

(71) Applicant: Corning Optical Communications LLC, Hickory, NC (US)

(72) Inventor: Brandon Robert Williamson, Hickory, NC (US)

(73) Assignee: CORNING OPTICAL COMMUNICATION LLC, Hickory, NC (US)

(*) Notice: Subject to any disclaimer, the term of this patent is extended or adjusted under 35 U.S.C. 154(b) by 0 days.

(21) Appl. No.: 14/742,099

(22) Filed: Jun. 17, 2015

(65) Prior Publication Data

US 2015/0370024 A1    Dec. 24, 2015

Related U.S. Application Data

(60) Provisional application No. 62/014,290, filed on Jun. 19, 2014.

(51) Int. Cl.
*G02B 6/00* (2006.01)
*G02B 6/44* (2006.01)
*C08L 23/12* (2006.01)

(52) U.S. Cl.
CPC .............. *G02B 6/441* (2013.01); *C08L 23/12* (2013.01); *G02B 6/00* (2013.01); *G02B 6/443* (2013.01);
(Continued)

(58) Field of Classification Search
None
See application file for complete search history.

(56) References Cited

U.S. PATENT DOCUMENTS 3,653,851 A * 4/1972 Gruber ............... B01D 39/2082
106/482
4,726,651 A * 2/1988 Wei ..................... G02B 6/02033
385/12
(Continued)

FOREIGN PATENT DOCUMENTS

DE    3610644 A1    10/1986
DE    4420989 A1    12/1995
(Continued)

OTHER PUBLICATIONS

Patent Cooperation Treaty, International Search Report for PCT/US2015/036183, mail date Nov. 27, 2015, 13 pages.
(Continued)

*Primary Examiner* — Thomas A Hollweg
*Assistant Examiner* — Erin Chiem
(74) *Attorney, Agent, or Firm* — William D. Doyle

(57) ABSTRACT

A loose-tube fiber optic cable includes a cable core and a jacket. The cable core includes a buffer tube and an optical fiber, where the optical fiber is within the buffer tube. The buffer tube may be positioned at an interior region of the loose-tube fiber optic cable and the jacket may be positioned around the cable core. Material forming the buffer tube may have a composition of greater than or equal to about 70% by weight of a polymer that includes propylene monomers. At least a portion of the polymer may have a beta phase crystal structure characterized by a pseudo hexagonal crystal structure.

18 Claims, 2 Drawing Sheets

(52) U.S. Cl.
CPC .......... *G02B 6/4486* (2013.01); *G02B 6/4434* (2013.01)

(56) References Cited

U.S. PATENT DOCUMENTS

| | | | | |
|---|---|---|---|---|
| 5,310,584 | A * | 5/1994 | Jacoby | C08J 5/18 426/127 |
| 5,761,362 | A | 6/1998 | Yang et al. | |
| 8,383,707 | B2 * | 2/2013 | Ruemer | C08F 210/06 524/226 |
| 8,586,163 | B2 * | 11/2013 | Malm | C08K 5/0083 428/35.7 |
| 2010/0027949 | A1 | 2/2010 | Bringuier et al. | |
| 2011/0294016 | A1 * | 12/2011 | Tamura | H01M 2/1653 429/251 |
| 2013/0149488 | A1 * | 6/2013 | Chandrasekaran | B32B 3/30 428/99 |
| 2014/0023331 | A1 | 1/2014 | Lim et al. | |

FOREIGN PATENT DOCUMENTS

| | | |
|---|---|---|
| EP | 0682066 A1 | 11/1995 |
| EP | 1115018 A1 | 7/2001 |
| EP | 1939167 A1 | 2/2008 |
| EP | 2014715 A1 | 1/2009 |
| EP | 2083042 A1 | 7/2009 |
| WO | 03/094832 A2 | 11/2003 |
| WO | WO2009056515 A1 | 5/2009 |

OTHER PUBLICATIONS

Mayzo Corporation, "Beta nucleating masterbatch offers enhanced properties in polypropylene products," Plastics Additives & Compounding, May/Jun. 2007, pp. 28-31. http://www.mayzo.com/beta-nucleating-masterbatch.html.

* cited by examiner

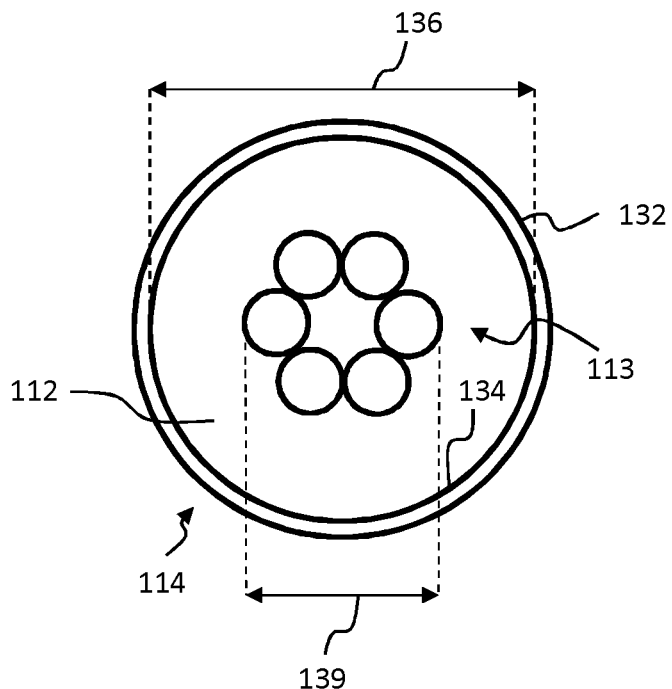
FIG. 2B
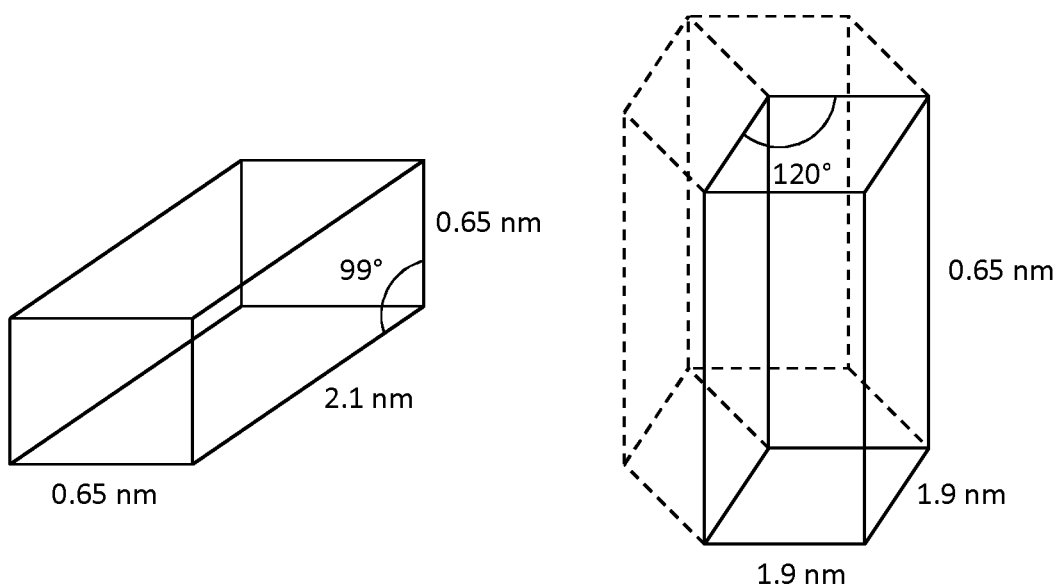
FIG. 3A
FIG. 3B

LOOSE-TUBE FIBER OPTIC CABLES HAVING BUFFER TUBES WITH BETA PHASE CRYSTALLIZATION

PRIORITY APPLICATION

This application claims the benefit of priority under 35 U.S.C. §119 of U.S. Application 62/014,290 filed on Jun. 19, 2014, the content of which is relied upon and incorporated herein by reference in its entirety.

BACKGROUND

The disclosure relates generally to fiber optic cables and, more particularly, to materials of construction for buffer tubes of loose-tube fiber optic cables.

No admission is made that any reference cited herein constitutes prior art. Applicant expressly reserves the right to challenge the accuracy and pertinency of any cited documents.

SUMMARY

One embodiment of the disclosure relates to loose-tube fiber optic cables comprising a cable core and a jacket. The cable core may comprise a buffer tube and an optical fiber and the optical fiber may be positioned within the buffer tube. The buffer tube may be positioned at an interior region of the loose-tube fiber optic cable and the jacket may be positioned around the cable core. The jacket may define an exterior surface of the loose-tube fiber optic cable. An outer diameter of the optical fiber may be substantially less than an inner diameter of the buffer tube. The buffer tube may comprise greater than or equal to about 70% by weight of a polymer comprising propylene monomers. At least a portion of the copolymer may have a beta phase crystal structure characterized by a pseudo hexagonal crystal structure.

An additional embodiment of the disclosure relates to loose-tube fiber optic cables comprising a cable core and a jacket. The cable core may comprise a buffer tube and an optical fiber and the optical fiber may be positioned within the buffer tube. The buffer tube may be positioned at an interior region of the loose-tube fiber optic cable and the jacket may be positioned around the cable core. The jacket may define an exterior surface of the loose-tube fiber optic cable. An outer diameter of the optical fiber may be substantially less than an inner diameter of the buffer tube. The buffer tube may comprise greater than or equal to about 70% by weight of a polymer comprising propylene monomers. The buffer tube may comprise from about 0.01% to about 5% by weight of one or more beta phase nucleating agents.

An additional embodiment of the disclosure relates to loose-tube fiber optic cables comprising a cable core and a jacket. The cable core may comprise a buffer tube and an optical fiber and the optical fiber may be positioned within the buffer tube. The buffer tube may be positioned at an interior region of the loose-tube fiber optic cable and the jacket may be positioned around the cable core. The jacket may define an exterior surface of the loose-tube fiber optic cable. An outer diameter of the optical fiber may be substantially less than an inner diameter of the buffer tube. The buffer tube may comprise greater than or equal to about 70% by weight of a polymer comprising propylene monomers. The buffer tube may comprise from about 0.01% to about 5% by weight of one or more beta phase nucleating agents. At least a portion of the copolymer may have a beta phase crystal structure characterized by a pseudo hexagonal crystal structure. At least about 50% of the portion of the copolymer that is crystallized may have the beta phase crystal structure Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2B schematically depicts a cross-sectional view of a buffer tube of a loose-tube fiber optic cable, according to one or more embodiments disclosed herein;

FIG. 3A schematically depicts a schematic view of the alpha phase crystal structure of polypropylene; and FIG. 3B schematically depicts a schematic view of the beta phase crystal structure of polypropylene.

DETAILED DESCRIPTION

Figure 1:
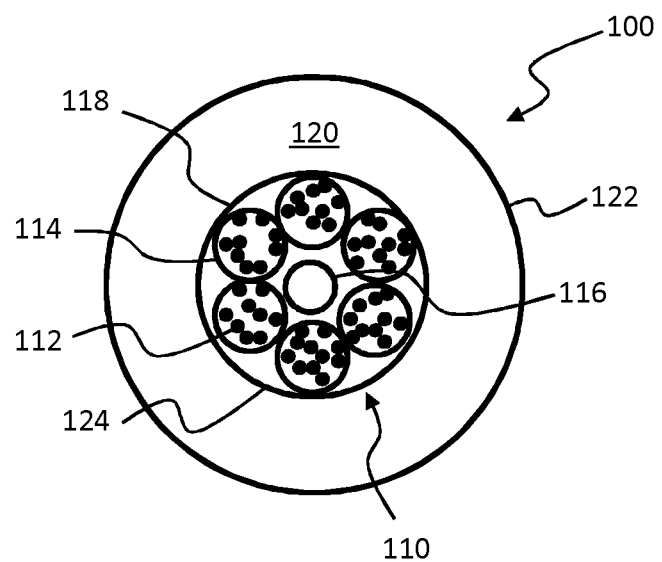
FIG. 1 schematically depicts a cross-sectional view of a loose-tube fiber optic cable, according to one or more embodiments disclosed herein.

Reference will now be made in detail to embodiments of loose-tube fiber optic cables, examples of which are illustrated in the accompanying drawings. Whenever possible, the same reference numerals will be used throughout the drawings to refer to the same or like parts. One embodiment of a loose-tube fiber optic cable is schematically depicted in FIG. 1. The loose-tube fiber optic cable generally includes at least one buffer tube, optical fibers, and a jacket. As described herein, the buffer tube may comprise a polymer comprising polypropylene monomers where at least a portion of the polymer has a beta phase crystal structure characterized by a pseudo hexagonal crystal structure. Such a buffer tube may undergo reduced or no secondary crystallization, where secondary crystallization can cause shrinkage in the length of a buffer tube in the time following fabrication of the buffer tube. Various embodiments of loose-tube fiber optic cables will be described herein with specific reference to the appended drawings.

Referring to FIG. 1, a cross-sectional view of a loose-tube fiber optic cable 100 is schematically depicted. In one embodiment, the fiber optic cable 100 generally includes a cable core 110 comprising one or more optical fibers 112, one or more buffer tubes 114, one or more strength members 116, or combinations thereof. The loose-tube fiber optic cable 100 may additionally comprise a jacket 120.

The cable core 110 generally includes optical fibers 112 that are positioned within buffer tubes 114. In some embodiments, the cable core 110 includes a plurality of optical fibers 112 positioned within one or more buffer tubes 114.

The cable core 110 may comprise a plurality of optical fibers 112 positioned within each of the one or more buffer tubes 114. The buffer tubes 114 may each contain one or more optical fibers 12, such as, for example, each buffer tube 114 may contain 6, 8, 10, 12, or even more optical fibers 112. The fiber optic cable 100, may contain more than one buffer tube 114, such as, for example, 2, 4, 6, 8, 10, 12, or even more buffer tubes 114. The fiber optic cable may further comprise a binder material 118 that may secure the components of the cable core 110 together, such as the buffer tubes 114 containing the optical fibers 112 and the strength member 116. For example, the binder material 118 may be a yarn that wraps around the cable core 110. The strength member 116 may comprise a rigid material that may contribute to the strength of the loose-tube fiber optic cable 100.

The cable core 110 may be surrounded by a jacket 120. In such an arrangement, the one or more buffer tubes 114 may be positioned at an interior region of the loose-tube fiber optic cable 100 and the jacket 120 may be positioned around the cable core 110. In one embodiment, the jacket 120 may be disposed as a layer around the one or more optical fibers 212 within buffer tubes 114 of the cable core 110. The jacket 120 may substantially surround the cable core 110. The jacket 120 may comprise an outer surface 122 and an interior surface 124. The interior surface 124 may be in direct contact with the cable core 110. In one embodiment, the interior surface 124 of the jacket 120 may be in direct contact with one or more components of the cable core 110. For example, the jacket 120 may be an extruded polymer that fills the spaces around the buffer tubes 114 and is direct contact with one or more buffer tubes 114. In another embodiment, the jacket 120 may surround the buffer tubes 114 but may not be directly in contact with all of the buffer tubes 114. The outer surface 122 of the jacket 120 may define the outer surface of the loose-tube fiber optic cable 100.

In one embodiment, the jacket 120 may comprise a polyolefin, polyamide, or combinations thereof. For example, in one embodiment, the jacket 120 may comprise, without limitation, polyethylene, polypropylene, ethylene-propylene copolymers, ethylene-propylene-butylene copolymers, or combinations thereof. Examples of polyethylenes include, without limitation, medium-density polyethylene (MDPE), high-density polyethylene (HDPE), low-density polyethylene (LDPE), and linear low-density polyethylene (LLDPE). Examples of polypropylenes include, without limitation, isotactic polypropylenes, atactic polypropylenes, and syndiotactic polypropylenes. Examples of polyamides include, without limitation, Nylon 12, Nylon 11, Nylon 6, Nylon 6,6, Nylon 6,12, and combinations thereof. As described herein, specific nylon chemical species referred to herein, such as, but not limited to, Nylon 12, Nylon 11, Nylon 6, Nylon 6,6, Nylon 6,12, include the impact modified nylons thereof. For example, as used herein, Nylon 12 refers to both impact modified Nylon 12 and non-impact modified Nylon 12.

Figure 2A:
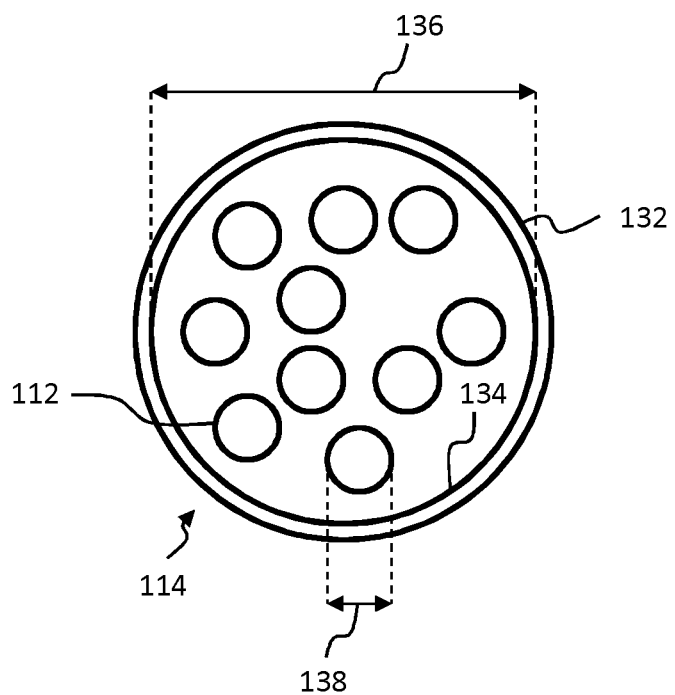
FIG. 2A schematically depicts a cross-sectional view of a buffer tube of a loose-tube fiber optic cable, according to one or more embodiments disclosed herein.

FIG. 2A shows an enlarged view of the buffer tube 114 of FIG. 1 containing a plurality of optical fibers 112. The buffer tube 114 comprises an outer surface 132 and an inner surface 134. The cross sectional shape of the buffer tube 114 may be substantially circular as shown in FIG. 2A, or may be non-circular in other embodiments. The greatest distance between portions of the inner surface 134 may define an inner diameter 136 of the buffer tube 114. The cross sectional shape of the optical fibers 112 may be sufficiently circular, and may have an outer diameter 138.

Referring now to FIGS. 1 and 2A, optical fibers 112 are depicted within the cable core 110 in a loose-tube configuration. In such a configuration, the outer diameter 138 of each of the optical fibers 112 may be substantially less than an inner diameter 136 of the buffer tube 114. For example, the ratio of the outer diameter 138 of an optical fiber 112 to the inner diameter 136 of the buffer tube 114 may be less than about 1:2, less than about 1:4, less than about 1:6, less than about 1:8, less than about 1:10, less than about 1:15, or even less than about 1:20.

Now referring to FIG. 2B, in another embodiment, the optical fibers 112 may be configured in a stranded pattern. For example, stranded optical fibers are disclosed in U.S. Pat. No. 5,703,983. The optical fiber strand 113 may include a several optical fibers 112 spun around one another. The optical fiber strand 113 has an outer diameter 139 that is less than the inner diameter 136 of the buffer tube 114. For example, the ratio of the outer diameter 138 of an optical fiber strand 113 to the inner diameter 136 of the buffer tube 114 may be less than about 1:1.1, less than about 1:1.2, less than about 1:1.4, less than about 1:1.5, less than about 1:1.8, or even less than about 1:2.

Referring now to FIGS. 1 and 2A, a cable width direction is defined in the axial direction of the fiber optic cable 100, shown as vertical and horizontal directions of FIGS. 1 and 2. A cable length direction is defined by the direction perpendicular the cable width direction. As used herein, "length" and "width" refer to the cable length and cable width directions as described herein. The various components of the cable core 110, such as the optical fibers 112 and the buffer tube 114 may have different lengths.

The buffer tube 114 may comprise a polymer, and a majority of the buffer tube 114 may be constructed from the polymer. For example, the buffer tube 114 may comprise greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 92%, greater than or equal to about 94%, greater than or equal to about 96%, or even greater than or equal to about 98% by weight of the polymer. In one embodiment, the polymer may be a copolymer which comprises two or more different monomers. The polymer may be a copolymer comprising propylene monomers and ethylene monomers, sometimes referred to as impact polypropylene. For example, the copolymer may comprise at least about 50% polypropylene monomers by weight, at least about 60% polypropylene monomers by weight, at least about 70% polypropylene monomers by weight, at least about 80% polypropylene monomers by weight, or even at least about 85% polypropylene monomers by weight. The copolymer may comprise from about 0.1% to about 15% ethylene monomers by weight, from about 12% to about 6% ethylene monomers by weight, or from about 8% to about 11% ethylene monomers by weight.

Generally, polypropylene may exist in one or more crystal structures. FIGS. 3A and 3B depict the alpha crystal structure and the beta crystal structure for polypropylene, respectively. All angles in FIGS. 3A and 3B are right angles unless marked otherwise by angle makings. As used herein, a beta phase crystal structure for a polymer is characterized by a pseudo hexagonal crystal structure, as shown in FIG. 3B. Portions of the polymer in the buffer tube 114 may exist in different crystal structures. For example, a percentage of the polymer may have an alpha phase crystal structure and a percentage of the polymer may have a beta phase crystal structure. The presence of a particular crystal structure may depend, at least in part, on the incorporation of a nucleating agent. Copolymers which include propylene monomers, especially having propylene monomers in a high percentage such as a least about 50%, may have alpha and beta crystallinity.

Generally, one or more of the optical fibers 112 may have a length that is greater than the length of the buffer tube 114 it is positioned within. For example, one or more of the optical fibers 112 may have a length that is about 1% longer than the length of the buffer tube 114. However, conventional buffer tubes, which generally are constructed from alpha phase crystallized impact polypropylene, such as impact polypropylene copolymer comprising propylene and ethylene monomers in combination with an alpha nucleating agent, may contract following fabrication of the buffer tube 114. As used herein, "fabrication" of the buffer tube means the formation of the buffer tube by extrusion or other like means and the subsequent cooling of the buffer tube to room temperature. Also, as used herein, a "conventional" buffer tube is a buffer tube comprising at least about 20% alpha phase crystal structure and less than about 1% beta phase crystal structure. The result of the shrinkage may be a decrease in the length of the buffer tube over the period of time following fabrication of the buffer tube 114. This reduction in length changes the ratio between the length of the buffer tube 114 and the length of the optical fiber 112. This ratio may be important in the manufacturing of the loose-tube fiber optic cable 100, as a particular ratio may be desired based on the application of the loose-tube fiber optic cable 100.

Without being bound by theory, it is believed that the conventional buffer tubes contract in the time following fabrication due to secondary alpha phase crystallization wherein following an initial alpha phase crystallization during fabrication, the buffer tube 114 further crystallizes in an alpha phase crystallization pattern. For example, the secondary crystallization may increase the amount of alpha phase crystallinity by at least about 1%, at least about 2%, or even at least about 5%. For example, a 5% alpha phase increase through secondary crystallization may change a conventional buffer tube having about 30% alpha phase crystallinity immediately following fabrication to about 35% alpha crystallinity within 24 hours following fabrication.

The buffer tubes 114 described herein generally have at least a portion of the polymer in the buffer tubes 114 in a beta phase crystal structure. Without being bound by theory, it is believed that beta phase polymers may not significantly undergo secondary crystallization and therefore does not undergo length reduction following fabrication. For example, in buffer tubes 114 described herein, the length of the buffer tube 114 may not decrease in length by more than about 0.5% of the length of the optical fiber 112 over a 24 hour period following the fabrication of the buffer tube 114. In other embodiments, the length of the buffer tube 114 may not decrease in length by more than about 0.4%, more than about 0.3%, more than about 0.2%, or even more than about 0.1% of the length of the optical fiber 112 over a 24 hour period following the fabrication of the buffer tube 114.

Generally, a portion of the polymer may be crystallized and the other portion of the polymer may be amorphous. For example, about 60% of the polymer may be amorphous and about 40% of the polymer may be arranged in a crystal structure configuration. In one embodiment, at least about 30% of the portion of the polymer that has a crystal structure in the buffer tube 114 may have a beta phase crystal structure. In other embodiments, at least about 50%, at least about 60%, at least about 70%, at least about 80%, at least about 90%, or even at least about 95% of the portion of the polymer that has a crystal structure in the buffer tube 114 may have a beta phase crystal structure. In one embodiment, less than about 70% of the portion of the polymer that has a crystal structure in the buffer tube 114 may have an alpha phase crystal structure. In other embodiments, less than about 50%, less than about 40%, less than about 30%, less than 20%, less than about 10%, or even less than about 5% of the portion of the polymer that has a crystal structure in the buffer tube 114 may have an alpha phase crystal structure.

In one embodiment, at least a portion of the polymer has a beta phase crystal structure and at least a portion of the polymer has an alpha phase crystal structure. The ratio of the amount of polymer that has a beta phase crystal structure to the amount of polymer that has an alpha phase crystal structure may be greater than or equal to about 1:2. In other embodiments, the ratio of the amount of polymer that has a beta phase crystal structure to the amount of polymer that has an alpha phase crystal structure may be greater than or equal to about 1:1, greater than or equal to about 2:1, greater than or equal to about 4:1, greater than or equal to about 10:1, or even greater than or equal to about 20:1. In one embodiment, the ratio of beta crystallinity to alpha crystallinity may affect the amount of length shrinkage in the buffer tube 114. Accordingly, a determined desired may be achieved by selecting an appropriate ratio of beta crystallinity and alpha crystallinity.

The amount of alpha phase and beta phase crystallinity may generally be determined by differential scanning calorimetry techniques. Samples are heated in a differential scanning calorimeter (DSC) from room temperature to about 200° C. at a rate of about 10° C. per minute. The alpha and beta crystallinity can be differentiated by their melt temperature, with beta and alpha crystallinity melting around 127° C. and 136° C., respectively. Melting enthalpy for each crystalline type can be compared to the theoretical heat of fusion to calculate the percent crystallinity of each phase using the following equations:

$$\% \ C(\alpha) = \left[\frac{H(\alpha)}{H_o(\alpha)}\right] \times 100$$

$$\% \ C(\beta) = \left[\frac{H(\beta)}{H_o(\beta)}\right] \times 100$$

where $H_o(\alpha)=209$ J/g and $H_o(\beta)=151.2$ J/g

The formation of beta phase crystal structure in the buffer tube 114 may be caused by a beta phase nucleating agent in the buffer tube 114. In one embodiment, the buffer tube 114 may comprise one or more beta phase nucleating agents operable to promote beta phase crystal structure formation in the polymer of the buffer tube 114. In one embodiment, the beta phase nucleating agent may be selected from N,N'-dicyclohexyl-2,6-naphthalene dicarboxamide; trans-quinacridone; pimelic acid and calcium stearate mixture; suberic acid; N,N'-Dicyclohexylterephthalamide; sodium 2,2'-methylene-bis-(4,6-di-tert-butylphenyl)phosphate; aluminium hydroxybis[2,2'-methylen-bis(4,6-di-tert butylphenyl)phosphate]; or combinations thereof. In one embodiment, the beta phase nucleating agent may be the nucleating agent of MPM 1141® or MPM 2000®, commercially available from MAYZO® of Suwanee, Ga., USA. The beta phase nucleating agent may be present in a masterbatch or as a pure substance and be mixed with the other components of the buffer tube prior to fabrication, such as by extrusion.

In one embodiment, the one or more buffer tubes 114 may comprise from about 0.01% to about 5% by weight of one or more beta phase nucleating agents. In other embodiment, the one or more buffer tubes 114 may comprise from about 0.1% by weight to about 5.0% by weight, from about 0.5% by weight to about 3.0% by weight, or from about 1.5% by weight to about 2.5% by weight of one or more beta phase nucleating agents.

In another embodiment, the buffer tubes 114 may comprise a filler material. For example, the buffer tube may comprise from about 1% to about 25% filler material. In some embodiments, the filler material may include ultrafine particles, such as ultrafine particles of a clay, such as halloysite. In some embodiments, the filler material may include micronized forms of hydrated magnesium silicate, such as 500-mesh talcum powder that may be surface-modified with a compatibilizer. In some embodiments, calcium inosilicate mineral, such as micronized wollastonite, may be included in the filler material, or calcium carbonate particles. In still other embodiments, ultrafine phyllosilicate particles may be used with the filler material, such as with fire-retardant fiber optic assemblies, such as lamellar silicates, such as nano-sized mica particles. Particles of filler material may be reacted with compatibilizers, such as organosilanes, to provide better interfacial adhesion to the base material. In another embodiment, other filler materials or combinations of such filler particles may be used.

The buffer tubes 114 described herein comprising beta phase polymers may have good strength properties which may be comparable or superior to conventional alpha phase impact polypropylene buffer tubes. For example, the buffer tubes 114 described herein may acceptable tensile modulus, crush resistance, and/or kink resistance for operability within a fiber optic cable.

The kink resistance of a buffer tube may be determined by loop testing. Loop testing determines the diameter of a loop and required force at which a particular buffer tube 114 will kink. Referring now to FIGS. 3A and 3B, during a test, a loop 212 with a diameter of 85 mm is formed and placed in the grips 214 of a tensile test machine. A low friction plastic ring 216 at the cross-over point holds the loop 212 in place. The top end of the buffer tube 210 is pulled at a rate of 250 mm per minute, decreasing the diameter of the loop 212 until kinking occurs. As such, the kink resistance is measured as the loop's diameter at kink. Kinking may be determined both by visual observation and by a 10% drop in the force from the peak force required to pull the buffer tube 210. Further, Applicants predict that the kink resistance diameter for buffer tubes disclosed herein will not increase more than 20% after 30 days aging at 85 degrees Centigrade and 85% relative humidity. Kink testing is performed without the optical fibers present.

The modulus of elasticity of a buffer tube may be determined by any conventional test for modulus of elasticity (i.e., Young's modulus, secant modulus, flexural modulus, tensile modulus).

The crush resistance of a buffer tube 114 may be determined by a crush test with a sample of the buffer tube that is 6 millimeters in length. The sample is placed between an upper movable plate and a lower stationary plate to receive a lateral compressive load perpendicular to the longitudinal axis of the tube. The load is applied by the tensile test machine at a speed of 6 millimeters per minute until the buffer tube is compressed to 50% of the original diameter. The crush loads at crush of 5% of the original diameter and at 25% of the original diameter due to tube compressive strain are recorded. For buffer tubes 112 disclosed herein, Applicants predict a crush load at 25% compression to be at least 20 N, such as at least 25 N, at least 30 N, and even at least 40 N is contemplated in at least some embodiments, such as those with larger tube dimensions. Further, Applicants predict that the magnitude of crush load required to achieve 25% compression of the buffer tube 112 will not decrease more than 20% after 30 days aging at 85 Centigrade and 85% relative humidity. Crush testing is performed without optical fibers in the buffer tubes.

In one embodiment, the buffer tube 114 may have a modulus of elasticity of greater than or equal to about 1600 MPa. In other embodiments, the buffer tube 114 may have a modulus of elasticity of greater than or equal to about 1800 MPa, greater than or equal to about 2000 MPa, greater than or equal to about 2200 MPa, or even greater than or equal to about 2400 MPa. By comparison, a conventional buffer tube may have a modulus of elasticity of less than or equal to about 1200 MPa.

In one embodiment, the buffer tube 114 may have a crush resistance of greater than or equal to about 18 N. In other embodiments, the buffer tube 114 may have a crush resistance of greater than or equal to about 22 N, greater than or equal to about 24 N, greater than or equal to about 26 N, or even greater than or equal to about 30 N. By comparison, a conventional buffer tube may have a crush resistance of less than or equal to about 18 N.

In one embodiment, the buffer tube 114 may have a kink diameter of less than or equal to about 30 mm. In other embodiments, the buffer tube 114 may have a kink diameter of less than or equal to about 28, less than or equal to about 26, less than or equal to about 24, or even less than or equal to about 20 mm. By comparison, a conventional buffer tube may have a kink diameter of greater than or equal to about 20 mm.

It will be apparent to those skilled in the art that various modifications and variations can be made without departing from the spirit or scope of the disclosed embodiments. Modifications combinations, sub-combinations and variations of the disclosed embodiments incorporating the spirit and substance of the disclosed embodiments may occur to persons skilled in the art.

What is claimed is:

1. A loose-tube fiber optic cable comprising a cable core and a jacket, the cable core comprising a buffer tube and an optical fiber, wherein:
   the optical fiber is positioned within the buffer tube;
   the buffer tube is positioned at an interior region of the loose-tube fiber optic cable;
   the jacket is positioned around the cable core;
   the buffer tube comprises greater than or equal to about 70% by weight of a polymer comprising propylene monomers; and
   at least a portion of the polymer has a beta phase crystal structure characterized by a pseudo hexagonal crystal structure;
   wherein at least a portion of the polymer has an alpha phase crystal structure and a ratio of an amount of the polymer that has the beta phase crystal structure to the amount of the polymer that has the alpha phase crystal structure is greater than or equal to about 1:1.

2. The loose-tube fiber optic cable of claim 1, wherein at least about 50% of the portion of the polymer that is crystalized has the beta phase crystal structure.

3. The loose-tube fiber optic cable of claim 1, wherein the buffer tube comprises from about 0.01% to about 5% by weight of one or more beta phase nucleating agents.

4. The loose-tube fiber optic cable of claim 3, wherein the one or more beta phase nucleating agents are selected from N,N'-dicyclohexyl-2,6-naphthalene dicarboxamide; trans-quinacridone; pimelic acid and calcium stearate mixture; suberic acid; N,N'-Dicyclohexylterephthalamide; sodium 2,2'-methylene-bis-(4,6-di-tert-butylphenyl)phosphate; aluminium hydroxybis[2,2'-methylen-bis(4,6-di-tert butylphenyl)phosphate]; or combinations thereof.

5. The loose-tube fiber optic cable of claim 1, wherein the cable core comprises a plurality of optical fibers positioned within the buffer tube.

6. The loose-tube fiber optic cable of claim 1, wherein the polymer is a copolymer comprising greater than or equal to about 80% by weight of propylene monomers and from about 12% to about 0.1% by weight of ethylene monomers.

7. The loose-tube fiber optic cable of claim 1, wherein the cable core comprises a plurality of buffer tubes and a plurality of optical fibers positioned within each of the buffer tubes.

8. The loose-tube fiber optic cable of claim 1, wherein:
one or more optical fibers has a length that is greater than the length of the buffer tube it is positioned within; and
the length of the buffer tube does not decrease by more than about 0.5% of the length of the optical fiber over a 24 hour period following fabrication of the buffer tube.

9. The loose-tube fiber optic cable of claim 1, wherein the buffer tube has a modulus of elasticity of greater than or equal to about 1200 MPa.

10. The loose-tube fiber optic cable of claim 1, wherein the buffer tube has a crush resistance of greater than or equal to about 18N.

11. The loose-tube fiber optic cable of claim 1, wherein a the buffer tube has a kink resistance diameter of less than or equal to about 30 mm.

12. A loose-tube fiber optic cable comprising a cable core and a jacket, the cable core comprising a buffer tube and an optical fiber, wherein:
the optical fiber is positioned within the buffer tube; the buffer tube is positioned at an interior region of the loose-tube fiber optic cable;
the jacket is positioned around the cable core, the jacket defining an exterior surface of the loose-tube fiber optic cable;
an outer diameter of the optical fiber is less than an inner diameter of the buffer tube;
the buffer tube comprises greater than or equal to about 70% by weight of a copolymer comprising propylene monomers and ethylene monomers; and
the buffer tube comprises from about 0.01% to about 5% by weight of one or more beta phase nucleating agents;
wherein at least a portion of the copolymer has an alpha phase crystal structure and a ratio of an amount of copolymer that has a beta phase crystal structure to the amount of copolymer that has the alpha phase crystal structure is greater than or equal to about 1:1.

13. The loose-tube fiber optic cable of claim 12, wherein the one or more beta phase nucleating agents are selected from N,N'-dicyclohexyl-2,6-naphthalene dicarboxamide; trans-quinacridone; pimelic acid and calcium stearate mixture; suberic acid; N,N'-Dicyclohexylterephthalamide; sodium 2,2'-methylene-bis-(4,6-di-tert-butylphenyl)phosphate; aluminium hydroxybis[2,2'-methylen-bis(4,6-di-tert butylphenyl)phosphate]; or combinations thereof.

14. The loose-tube fiber optic cable of claim 12, wherein a portion of the copolymer is crystalized and at least about 50% of the portion of the copolymer that is crystalized has a beta phase crystal structure.

15. The loose-tube fiber optic cable of claim 12, wherein the cable core comprises a plurality of optical fibers positioned within the buffer tube.

16. The loose-tube fiber optic cable of claim 12, wherein the cable core comprises a plurality of buffer tubes and a plurality of optical fibers positioned within each of the buffer tubes.

17. A loose-tube fiber optic cable comprising a cable core and a jacket, the cable core comprising a buffer tube and an optical fiber, wherein:
the optical fiber is positioned within the buffer tube;
the buffer tube is positioned at an interior region of the loose-tube fiber optic cable;
the jacket is positioned around the cable core, the jacket defining an exterior surface of the loose-tube fiber optic cable;
an outer diameter of the optical fiber is less than an inner diameter of the buffer tube;
the buffer tube comprises greater than or equal to about 70% by weight of a copolymer comprising propylene monomers and ethylene monomers
the buffer tube comprises from about 0.01% to about 5% by weight of one or more beta phase nucleating agents;
at least a portion of the copolymer has a beta phase crystal structure characterized by a pseudo hexagonal crystal structure; and
at least about 50% of the portion of the copolymer that is crystalized has the beta phase crystal structure.

18. The loose-tube fiber optic cable of claim 17, the copolymer comprises greater than or equal to about 80% by weight of propylene monomers and from about 6% to about 12% by weight of ethylene monomers.

* * * * *